Sept. 2, 1952 J. D. RYAN ET AL 2,609,269

GLARE SCREEN

Original Filed Nov. 18, 1948 8 Sheets-Sheet 1

Inventors
Joseph D. Ryan and
Paul P. Mattimoe

By Nobbe & Swope
Attorneys

GLARE SCREEN

Inventors
Joseph D. Ryan and
Paul P. Mattimoe

By Nobbe & Swope
Attorneys

Sept. 2, 1952 J. D. RYAN ET AL 2,609,269

GLARE SCREEN

Original Filed Nov. 18, 1948 8 Sheets-Sheet 3

Inventors
Joseph D. Ryan and
Paul P. Mattimoe

By
Nobbe & Swope
Attorneys

Sept. 2, 1952 | J. D. RYAN ET AL | 2,609,269

GLARE SCREEN

Original Filed Nov. 18, 1948 | 8 Sheets-Sheet 4

Inventors
Joseph D. Ryan and
Paul P. Mattimoe

By
Nobbe & Swope
Attorneys

Sept. 2, 1952 J. D. RYAN ET AL 2,609,269

GLARE SCREEN

Original Filed Nov. 18, 1948 8 Sheets-Sheet 5

Inventors
Joseph D. Ryan and
Paul P. Mattimoe

By Nobbe & Swope
Attorneys

GLARE SCREEN

Original Filed Nov. 18, 1948

Inventors
Joseph D. Ryan and
Paul P. Mattimoe

By

Nobbe & Swope

Attorneys

Sept. 2, 1952 J. D. RYAN ET AL 2,609,269

GLARE SCREEN

Original Filed Nov. 18, 1948 8 Sheets-Sheet 7

Inventors
Joseph D. Ryan and
Paul P. Mattimoe

By
Nobbe & Swope
Attorneys

GLARE SCREEN

Original Filed Nov. 18, 1948

Joseph D. Ryan and Paul R. Mattimoe Inventors
By Nobbe & Swope Attorneys

Patented Sept. 2, 1952 2,609,269

UNITED STATES PATENT OFFICE 2,609,269

GLARE SCREEN

Joseph D. Ryan and Paul T. Mattimoe, Toledo, Ohio, assignors to Libbey-Owens-Ford Glass Company, Toledo, Ohio, a corporation of Ohio Original application November 18, 1948, Serial No. 60,725. Divided and this application April 4, 1950, Serial No. 153,782. In Canada September 30, 1949

4 Claims. (Cl. 8—4)

The present invention relates generally to glare screens, and more particularly to a novel type of laminated safety glass window, windshield or the like that is provided with a built-in glare-reducing portion.

This application is a division of our copending application filed November 18, 1948, Serial No. 60,725.

Briefly stated, this invention contemplates a laminated safety glass unit which includes a non-brittle plastic interlayer having a colored or neutral shaded glare-reducing portion which is preferably of a shade graduated from deep or opaque at one side of its area to practical extinction at another, laminated with one or more sheets of glass which have a relatively high luminous transmittance in the visible region of the spectrum, but have relatively low ultra-violet light transmittance.

The article of the invention has particular utility when employed as a window or windshield in vehicles, or in other places where the elimination or reduction of glare from the sun or objectionably bright artificial light is desirable. The importance of reducing glare through the window and windshields of passenger automobiles, buses, railroad trains, and aircraft of all kinds has, of course, long been recognized, and a great deal of work has been done in attempting to provide adequate and satisfactory glare-reducing means for this purpose.

Probably, the greatest proportion of this work has been concentrated on the reduction of glare through the windshields of automobiles, first, because clear vision through the windshield is of utmost importance and, second, because it is from the windshield that both drivers and passengers are most likely to be inconvenienced and made uncomfortable by glare, not only from direct and reflected rays of the sun, but also from the headlights of oncoming vehicles, and so forth.

Moreover, the trend in present day automotive design is toward ever increasing window areas in automobiles and, in the case of windshields in particular, the tendency is not only to make them wider, but higher as well, and to carry them farther and farther into what was formerly considered to be the roof area of the car. Such modern, streamlined, and rather revolutionary designing presents new and much more difficult problems from the standpoint of glare, and renders known glare-reducing means virtually obsolete and of minimum practical value. For example, the familiar cloth visors now widely used in automobiles are not practicable for the new type windshields. Moreover, such visors are unsatisfactory because of their complete opacity and the fact that they cut off a large share of the driver's vision when in operative position and make it impossible for him to see stop lights without peering around or under the visor.

Now, it is an aim of the present invention to provide a special type of laminated safety glass unit, having an integral glare-reducing portion of a special type, for use as a window or windshield, and which lends itself readily to even the most extreme, modern, automotive designs.

Another object is the provision of a unit of the above character in which at least a portion of the plastic interlayer is colored, or neutrally shaded, to provide a glare-reducing or glare-eliminating area, that is free from haze, in the unit.

Another object is to provide, in such a unit, a glare-reducing portion which is vignetted; that is, in which the color or neutral shade is very deep or intense in the area presenting the greatest glare, but tapers off gradually to a very low intensity, or to no shade or color at all, as it approaches the essential sighting area of the unit.

The importance of this accomplishment cannot be overemphasized since experience has shown that an internal visor of uniform shade with sharp cut-off between low and high light transmitting areas is most distracting to the operator of a vehicle. Not only does fatigue result because of the rapid rate of eye accommodation required in shifting of the eye from a low level of illumination to a high level, but distraction results from the rapid rate of shift of the sharp cut-off as the vehicle, and particularly an automobile, responds to unevenness of the highway. Another extremely bothersome factor arising from a sharp cut-off is the failure to properly provide for height differences of individuals operating a vehicle. Thus, a visor appropriate for a shorter individual is totally unsuited for a taller one, since his eye level line is too high, requiring "ducking" of the head for easy operation.

Another object is the provision of a light stable, antiglare window or windshield of this same general character in which the glare-eliminating or reducing portion of the unit is produced by dyeing the plastic interlayer prior to laminating it together with the glass.

Still another object is the provision in such a unit of a glass sheet or sheets of a character which absorb or otherwise reduce the transmission of objectionable light rays into and through the unit, and which have antiglare properties of their own.

Other objects and advantages of the invention will become more apparent during the course of the following description, when taken in connection with the accompanying drawings.

In the drawings, wherein like numerals are employed to designate like parts throughout the same:

Figures 1, 2, 3, 14:
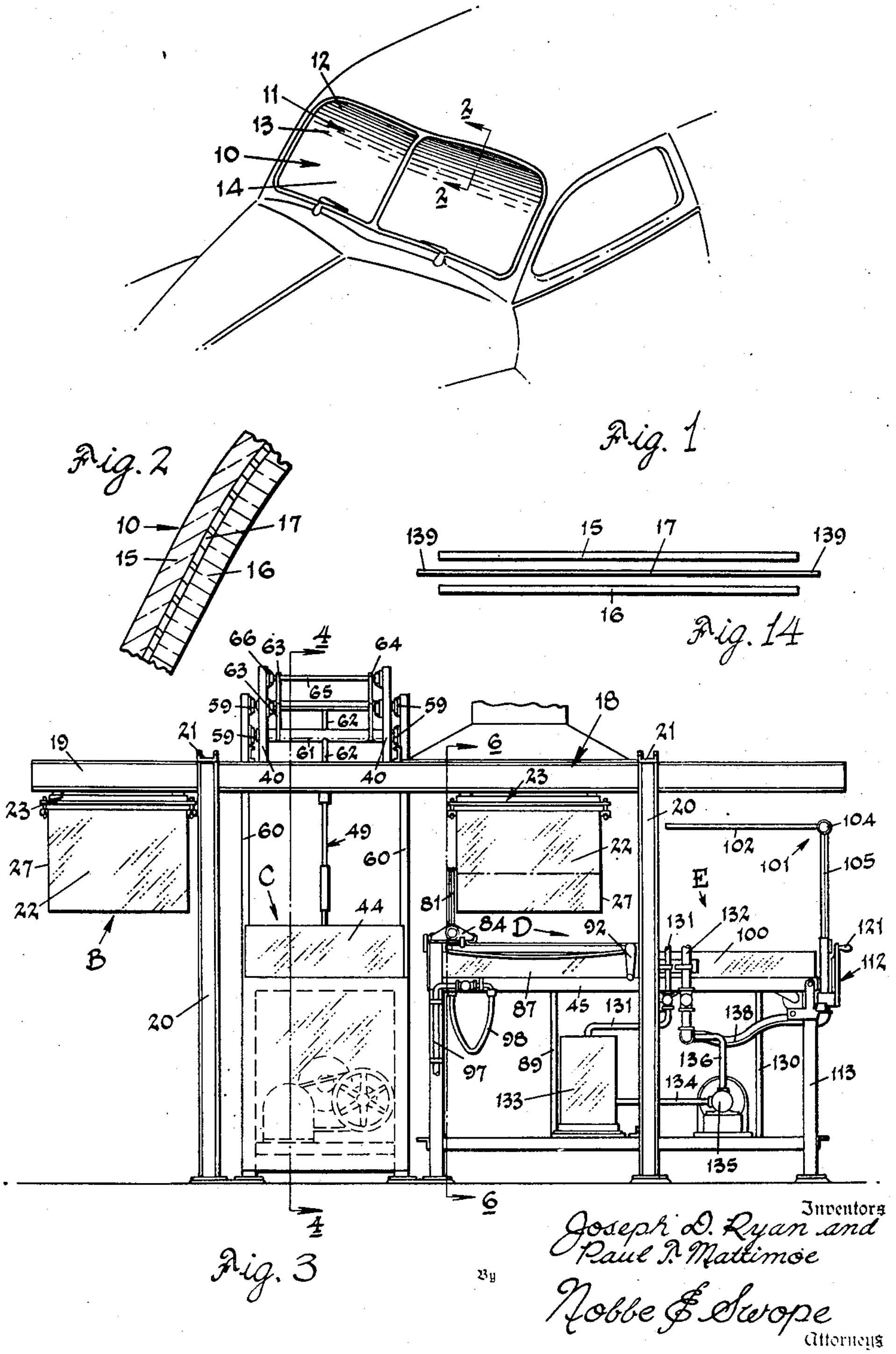
Fig. 1 is a fragmentary perspective view of an automobile having a windshield produced in accordance with the invention.
Fig. 2 is a fragmentary section taken substantially on the line 2—2 in Fig. 1.
Fig. 3 is a side elevation of the dyeing apparatus of the invention.
Fig. 14 is a disassembled view of the several laminations of one of the units of the invention showing the relative position of the several layers in assembling them together into a sandwich prior to laminating.

Referring now more particularly to the drawings, it will be noted that the automobile shown in Fig. 1 has large window areas, and that the windshield 10 extends upwardly to a greater extent than heretofore, and is bent so as to actually form the forward roof portion of the car. This type of design provides an extremely wide range of vision for the occupants of the vehicle and opens up the field of vision from the car for greater enjoyment of the driver and passengers at most hours of the day and night.

One very important disadvantage of this design, however, though it may be only occasional, is that rays of the sun, even when at a very steep angle, may pass through the windshield. Or, differently expressed, when the sun is only slightly past its zenith, it may shine through a windshield of this design when the car is traveling toward the sun. For that matter, similar difficulty is encountered, even with flat glass windshields, when set at the angle common to most present day automotive designs.

This is of course undesirable, because of the effect of the direct and reflected glare, from light shining on the windshield, on the eyes of the front seat occupants, and also because of the heat that is brought into the car in this way.

Attempts have recently been made to overcome this difficulty by providing opaque sun visors projecting outwardly over the windshield and at an angle thereto; and, in some cases, over the doors. However, while these effectively cut off the rays of the sun, they also defeat the primary purpose of the wide view windshield design. In addition, they are open to all of the objections to an extra accessory that juts out from the main body of the automobile, ruining streamlining and cutting down speed. (Actual tests show that such visors will cut down car speeds as much as 5 to 10 miles per hour.) Moreover, overhead stop lights and danger signals can not be seen through them and manufacturers of these visors have gone so far as to suggest the use of prism reflectors in cars equipped with them to overcome this serious disadvantage.

Now we have found that this problem of glare can be effectively solved in an entirely different way, by the provision of an antiglare means that forms an integral part of the laminated safety glass of the windshield and will cut out the objectionable rays without materially affecting desired visibility through the glass.

We do this primarily by governing, by gradation, the amount of light permitted to enter through a given area of the windshield, thus giving light where needed without blinding the occupants and, at the same time, cutting out light where this is desirable while permitting adequate vision wherever necessary.

As shown in Fig. 1, in a preferred form, the antiglare means of the invention is a color or neutral shading 11 within the windshield itself, and is vignetted or graduated in shade from a deep hue at 12 along the top margin of the windshield, which may be opaque, or nearly opaque, to a very light hue 13 in the area adjacent the essential viewing area 14 of the driver and through which he sees the road and oncoming traffic.

The advantage of this arrangement will be immediately apparent. Thus, the depth of hue or color or shade, and consequently the glare-reducing properties, are greatest in the area from which the greatest glare will come, and lightest in the area where the greatest visibility is required. In other words, the amount of light reaching the eye of the driver or rider will be gradually increased as he shifts his line of sight downwardly toward the area where complete visibility is essential and, conversely, the amount of light reaching his eye will be progressively decreased as he moves his line of sight upwardly toward the area of potentially greatest glare.

A further advantage is that the observer's eyes are protected while looking at bright, higher objects such as the sky, mountains, and so forth, whereas his vision is in no way obscured when looking at objects on the road or on the ground, around or below the horizon level.

Figure 15:
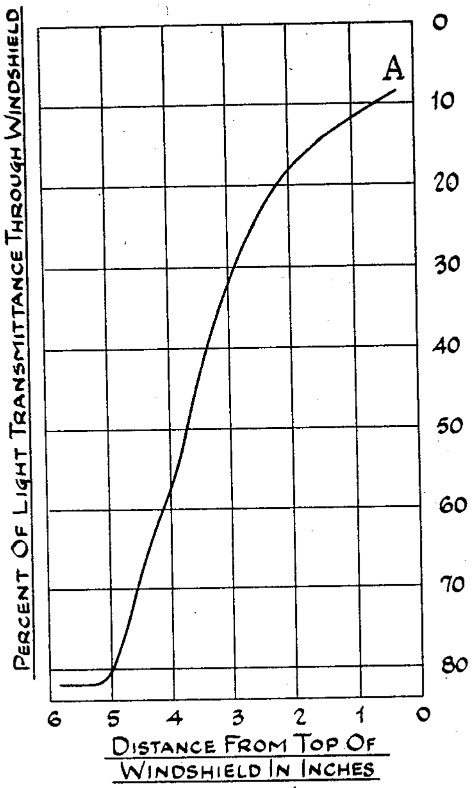
Figs. 15, 16, 17 and 18 are graphic illustrations of light transmission curves for the colored or shaded areas of four windshields having differently dyed plastic interlayers.
Figure 16:
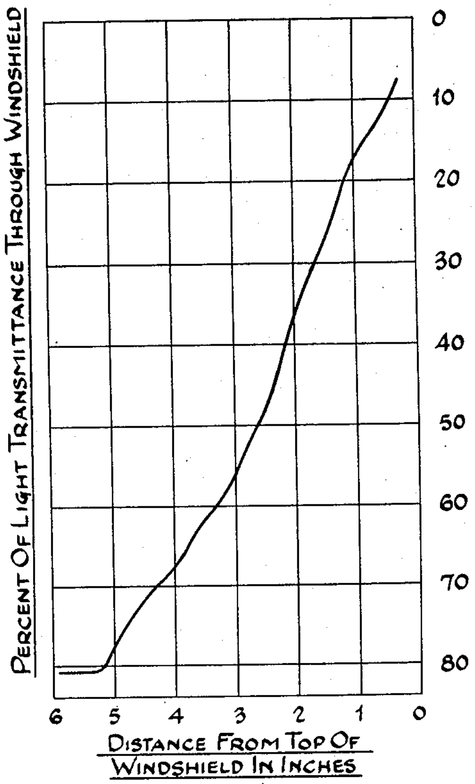

To illustrate this feature more plainly, there is shown in Fig. 15 a light transmission curve for a windshield made in accordance with this invention and wherein the distance from the top of the shield is plotted as the abscissa and the per cent of light transmission through the shield is plotted as the ordinate. From this curve it will be seen that as the driver lowers his eye from the top of the shield, designated A on the graph, to a point anywhere in the colored or shaded area, which in this case is 5 inches wide, he can select any area of light transmission best suiting the particular driving conditions encountered. Should no glare be encountered, he can then view traffic through the uncolored area of very high and constant light transmission.

As best illustrated in Fig. 2, laminated safety glass of the type generally employed in automobile windshields is made up of two sheets of glass 15 and 16, and an interposed layer of a relatively soft but tough thermoplastic material 17, all bonded together under the action of heat and pressure into a composite unitary structure; and, as explained above, the antiglare portion of a laminated glass unit made according to the present invention is produced by coloring or giving a neutral shade to an area of the plastic interlayer 17 before laminating it together with the glass sheets.

Contrary to the opinion of leaders in the dye industry, we have discovered that we can satisfactorily accomplish this, and can even obtain a uniformly graduated and unstreaked vignetted effect where desired, by dyeing a marginal portion of the plastic interlayer sheeting. As a matter of fact, we believe that this is the only way the desired effect can be obtained in a commercially practicable and satisfactory structure.

The dyeing can be done by a number of different means, but in Figs. 3 to 12 of the drawings there is illustrated an apparatus that has proved very satisfactory for the purpose. As best shown in Fig. 3, this dyeing apparatus includes a framework 18 made up of a pair of longitudinally extending, horizontal channels 19 supported upon floor beams 20 and connected together by bridging members 21 extending transversely thereof between the upper ends of the floor beams.

The plastic sheets 22 are adapted to be carried into and through the dyeing apparatus upon a supporting carriage 23. The carriage 23 is rectangular in form being constructed of four angle irons 24, welded together in the form of a frame, and four upwardly extending angle irons or corner ports 25 bolted to the corners of the frame. Depending from the end angle irons of the carriage 23 are a series of adjustable hook bolts 26, arranged in regularly spaced relation therealong, to support the plastic sheets to be dyed.

Figures 6, 7, 8:
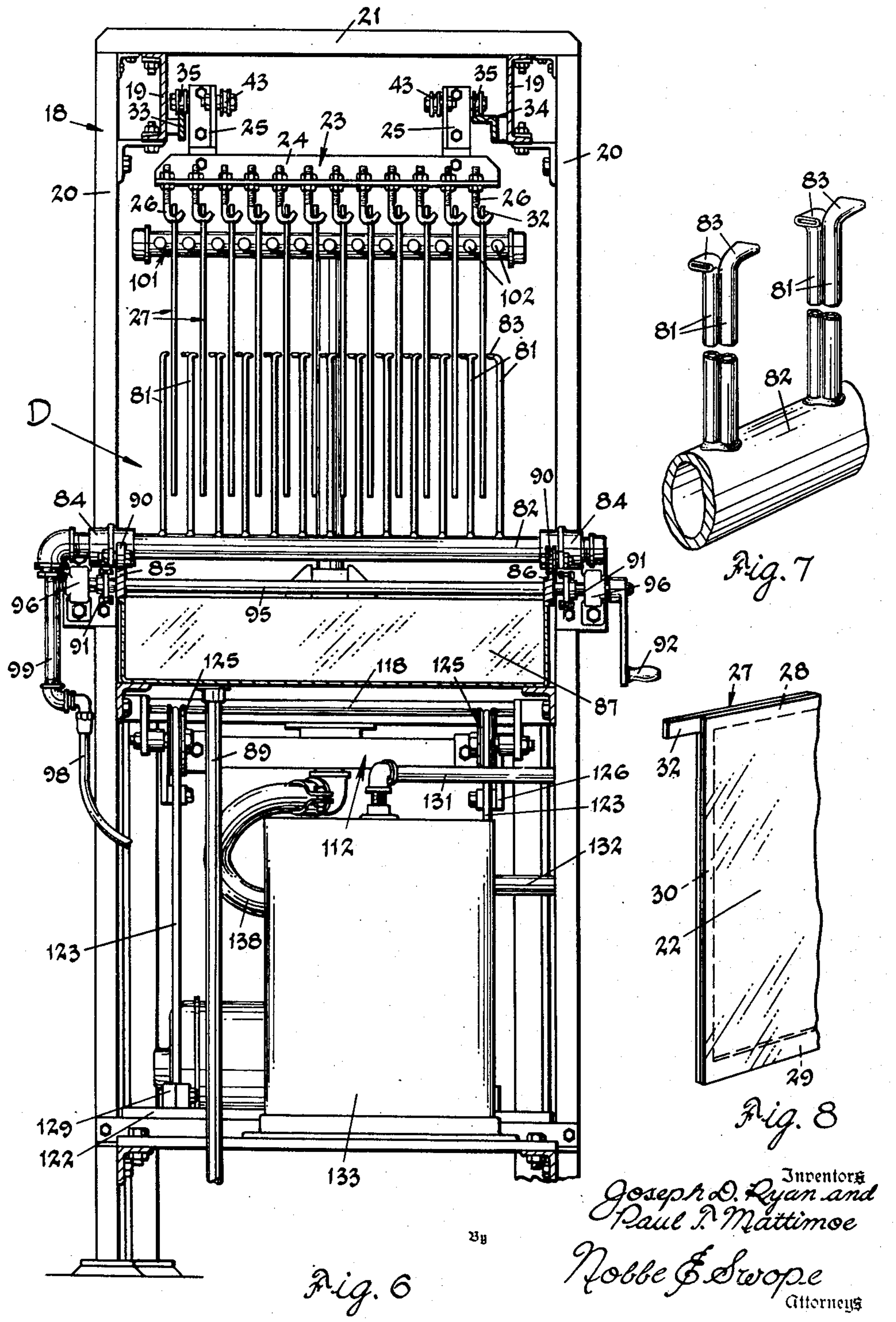
Fig. 6 is a vertical transverse section taken on the line 6—6 in Fig. 3, showing the first rinsing section of the dyeing apparatus.
Fig. 7 is a perspective view of some of the spraying elements for rinsing the plastic sheets.
Fig. 8 is a perspective view of a dipping frame showing a sheet of plastic attached along its perimeter.

For ease in handling the plastic sheets 22 during the dyeing procedure, we prefer to mount them on suitable carrying and dipping frames 27. As best shown in Fig. 8, these frames may be of rectangular open shape, having top, bottom and side rails 28, 29, 30 and 31, respectively, of light metal, with the top rail 28 being provided with end extensions 32 by which the frames can be suspended from the hook bolts 26 of the carriage 23.

The plastic sheets 22 can be secured to the frames 27 in any desired manner but we prefer to adhesively secure them in place by first coating the frame surfaces with a plastic solvent and then smoothing the marginal edges of the plastic sheet into full contact with the frame.

To start the dyeing procedure, a carriage 23 is supported at the loading station B upon rails 33 and 34, secured to the channels 19, and adapted to be engaged by grooved wheels 35, mounted on the outside of the posts 25. It will be noted that the rail 34 is in the form of an angle iron which presents a flat surface to engagement by the wheels. With this arrangement a slight sidewise sliding motion of the carriage is permitted during its longitudinal rolling movement from the loading section and into and through the subsequent rinsing sections. Also, the fact that all four of the wheels 35 are grooved permits the carriage to be properly located on the rails regardless of which end of the carriage is introduced into the loading section first.

With the carriage 23 located in the loading section B, a plurality of frames 27, to which plastic sheets have been attached, are hung on the carriage from the hook bolts 26. As soon as the carriage has been loaded it is ready to be moved into the dipping section C.

Figures 4, 5:
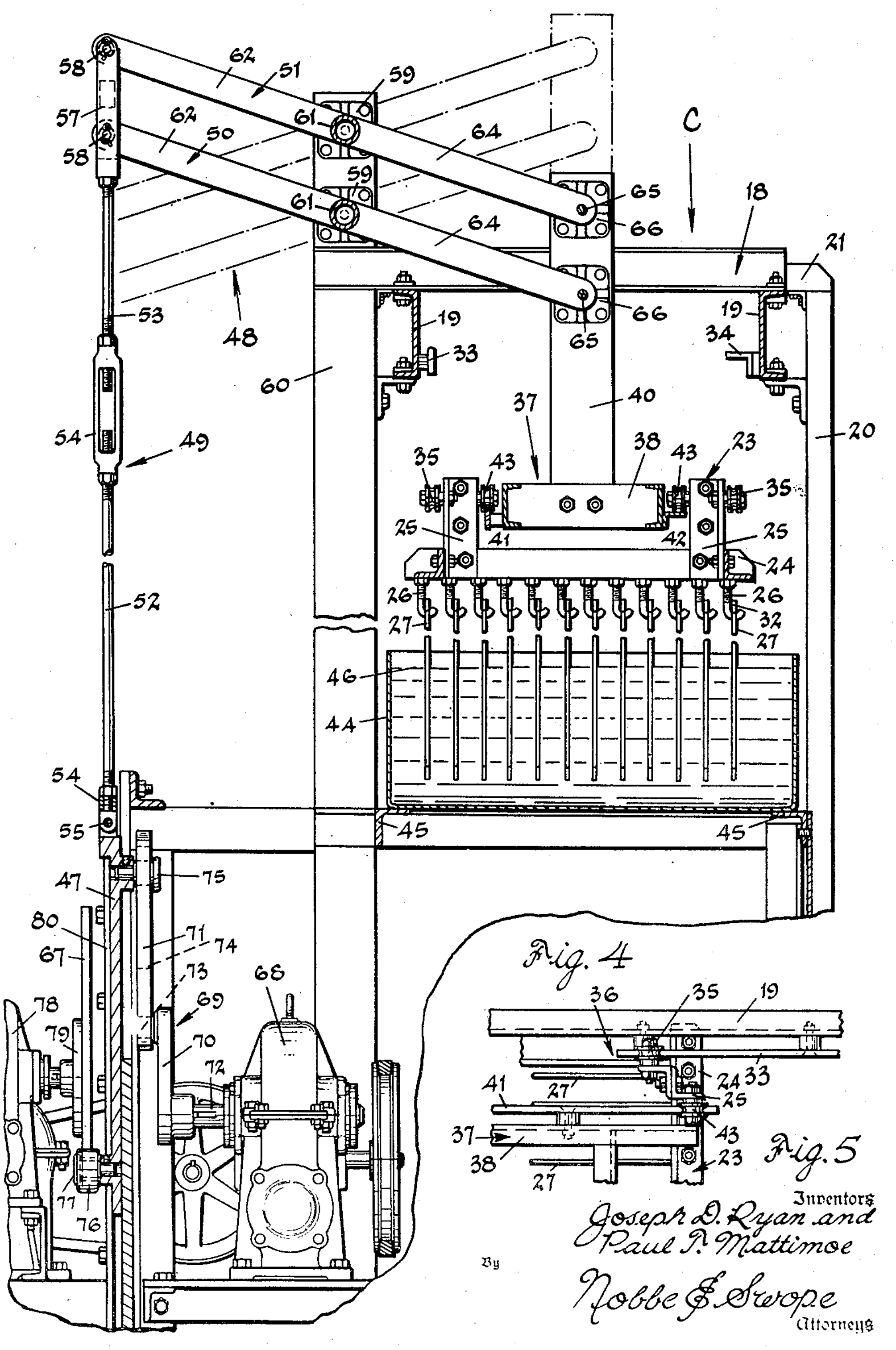
Fig. 4 is a vertical transverse sectional view taken substantially on the line 4—4 in Fig. 3.
Fig. 5 is a fragmentary plan view of the transfer rails over which the plastic sheets are conveyed through the dyeing apparatus.

Within the dipping section C, the tracks 33 and 34 are cut out as shown at 36 in Fig. 5, and located in this cut-out area is a vertically movable dipping elevator 37 which includes a horizontal framework 38 made up of four channel irons 39. The framework 38 is supported for vertical dipping movement upon upwardly extending posts 40.

The opposite side members of the framework 38 carry rails 41 and 42 which are similar in form to the rails 33 and 34, respectively, but are located inwardly thereof to receive the grooved wheels 43 of the carriage 23 and which are mounted on the inside of the corner posts 25. Thus, as the loaded carriage 23 leaves the loading station B and moves into the dipping station C, the wheels 35 of the carriage leave rails 33 and 34 and the wheels 43 ride onto the rails 41 and 42 to locate the plastic sheet carrying carriage on the elevator 37. From this position, the lower margins of the plastic sheets can be immersed into a vat 44, which is supported on horizontal angles 45 extending between the floor beams 20, and contains a supply of dyeing solution, as indicated at 46.

When the carriage is in position on the elevator framework 37, it is placed under control of a system which lowers the said framework a predetermined distance toward the bath, after which a timing device operates to cause the margins of the plastic sheets to be moved slowly downward in a manner to gradually and progressively immerse the area of the plastic sheets that it is desired to color or shade into the dye solution 46.

While various elevator systems may be advantageously and interchangeably employed for this purpose, i. e., hydraulic, electric or mechanical combinations, we have selected as a preferred construction, a lever arm type structure operated by a motion controlled cam and slide plate. As illustrated in Fig. 4, for example, a slide plate 47 is connected to the posts 40 through a linkage 48 which includes a compound rod 49 and pivotal arms 50 and 51. The rod 49 comprises a pair of threaded rods 52 and 53, interjoined by a turnbuckle 54 by means of which the length between the extremities of the said rods may be altered to locate the rails 41 and 42 of the framework 38 substantially level with the rails 33 and 34. The rod 52 is threaded into a link 55 pivotally attached to the slide plate 47 by a pin 56 while to the outer end of the rod 53 a clevis 57 is threadably attached. The clevis 57 is drilled to receive pins 58 which are inserted through the ends of arms 50 and 51 and the adjoining sides of the clevis. The arms 50 and 51 are journaled, so as to revolve, in bearings 59 mounted on columns 60 of the frame 18. More particularly, the arms 50 and 51 each have a centrally disposed tubular portion 61 from which extends bars 62, 63 and 64, the bar 62 of each arm being related, at its outer end, to the clevis 57 by the pin 58.

As best illustrated in Fig. 5, the bars 63 and 64 of each arm are interconnected at their outer ends by a rod 65, the projecting ends of which are journaled in bearings 66 secured to the upwardly extended posts 40 of the framework 38. Thus, as the slide plate 47 moves upwardly, the arms 50 and 51 will revolve on their respective bearings 59 and tilt from the positions indicated in phantom line (Fig. 4) to the position shown in full lines, in which position the carriage 23 is at the lowest point of the dipping stroke. Downward movement of the slide plate inversely produces upward motion of the framework or removal of the plastic sheets from the dyeing solution 46 contained within the vat 44.

Movement of the slide plate, in either direction, is designed to effect rapid, partial descent of the carriage 23 and the plastic sheets 22, suspended therefrom, subsequent descent controlled by the surface of a cam 67 and after a predetermined time period, rapid elevation to quickly remove the said sheets. Accomplishment of these sequential phases of operation is achieved by the operation of geared units which are mechanically related to the slide plate 47. Thus, the geared unit 68 operates a linkage 69 comprising arms 70 and 71, the arm 70 being keyed to the shaft 72 of the unit 68 and pivotally connected to the arm 71 by a pin 73. The arm 71 is slotted, as indicated at 74, to permit free movement of a stud 75 therein upon movement of the stud by the slide plate 47 in which said stud is fixedly secured.

Motion of the slide plate is caused by the pull exerted by weight of the carriage 23 through the arms 50 and 51 and compound rod 49. However, when the carriage 23 is received on the framework 38, the effect of such a weight force is offset by a resistance established in the unit 68, the brake of its drive motor and the drive belt thereof. Operation of the unit 68 thus creates a mechanical counter-balance and during a portion of such operation affords a control for descent of the framework 38 and carriage 23. When the arm 70 of the linkage 69 has completed substantially a half revolution, the slide plate is raised sufficiently to place it in the control surface area of the cam 67. The cam is engaged by a roller 76 carried by the plate 71 near its lower end by a stud 77.

Through electrical controls (not shown) the unit 68 is now rendered inoperative and a similar gear drive, indicated at 78, is started. The cam 67 is secured to a face plate 79 keyed to the output shaft of the unit 78 and the influence afforded during its rotation is determined by the cam areas of its surface. The roller 76 thus rides on the cam surface which gradually permits rising of the slide plate within slide or guideways 80 secured to the main structure 18. The timing cycle of the dipping produces the graded area of the plastic sheets and consequently variously generated cam surfaces may be employed to selectively control the extent and the time period to which the plastic sheets are further immersed into the vat 44 and the solution 46 contained therein.

Accordingly, the lowest point in descent of the sheets may be established and when this point is reached, it is desirable to rapidly raise the carriage. Adequately positioned controls are now effected to resume operation of the unit 68 and, through the linkage 48, to engage the stud 75 by an end of the slot 74 in the arm 71. Rotation of the shaft 72 to complete a full revolution of the arm 70 of said linkage 69 produces consequent separation of the roller 76 from the surface of the cam 67 and delivery of the slide plate 47 to the lower extremity of its travel. Through the rod 49 and arms 50 and 51, this movement of the plate 47 is transmitted to the framework 38 to raise it and the carriage 23 to a point where the rails 41 and 42 on the elevator framework are again in alignment with the rails 33 and 34 of the loading and rinsing sections.

Immediately upon completion of the dyeing cycle, the carriage 23 is propelled toward the rinsing sections D and E and, as it moves out of the dipping section C, the wheels 43 ride off the rails 41 and 42 on the elevator while the wheels 35 ride onto the section of the rails 33 and 34 leading to the rinsing sections. The manner in which the wheels 43 leave the rails 41 and 42 while the wheels 35 engage the rails 33 and 34 is best shown in Fig. 5.

Figure 9:
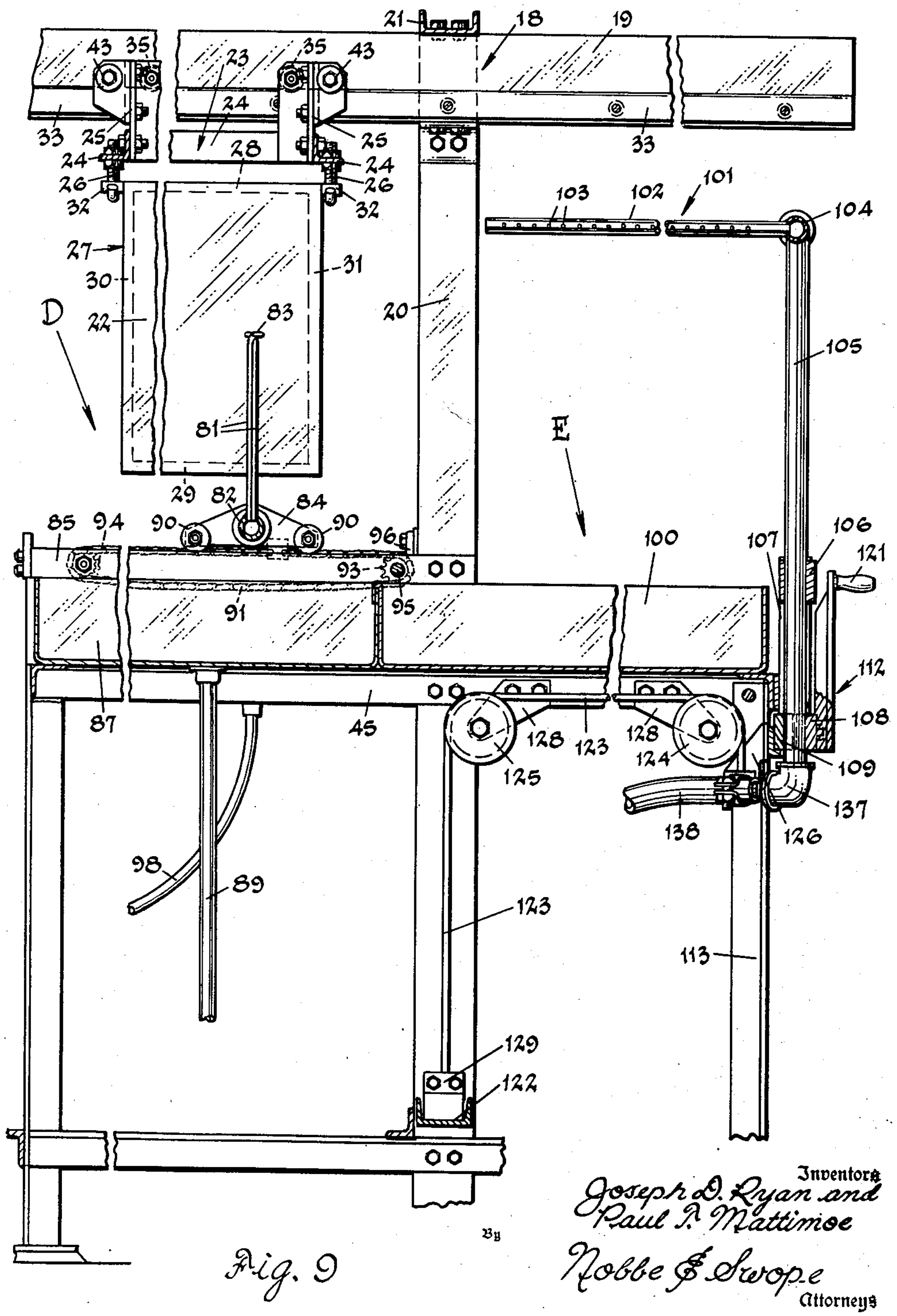
Fig. 9 is a partial longitudinal section of the dyeing apparatus and, more particularly, of the first and second rinsing sections.

As the plastic sheets on the carriage 23 move into the first rinse section D, they are immediately subjected to an alcohol rinse by means of spray pipes 81. The pipes 81 are arranged in pairs along a manifold pipe 82 and their ends are suitably flattened and bent, as at 83, to direct the alcohol against the opposed surfaces of adjacent sheets. Preferably, the spray pipes 81 are of sufficient height to present the alcohol in areas along and above the areas of the plastic sheets which have been effected by the dyeing solution. As shown in Fig. 9, the manifold pipe 82 is supported in carriages 84 which traverse rails 85 and 86, horizontally disposed along and above the sides of a receiving tank 87. The tank or tray 87 is supported on the angles 88 and is connected to a usual sump by the pipe 89.

The carriages 84 are supported by wheels 90 on the rails 85 and 86 and are propelled by chain belts 91, driven by a crank 92 and trained over sprocket gears 93 and 94. The sprocket gear 93, constituting the driver for the belts 91, is keyed to a shaft 95 journaled in bearings 96 and extending through the rails 85 and 86. Ordinarily, one pass of the pipes 81 will produce the desired rinsing effect on the plastic sheets and the dyed areas thereof; however, if further rinsing is found necessary, rotation of the crank 92 in the opposite direction will return the carriages 84 to a position substantially as shown in Fig. 3.

The alcohol is delivered to the manifold pipe 82 from a supply pipe 97, through a length of flexible tubing 98 and suitable fittings 99.

From the first rinse area D, the carriage 23 is propelled along the rails 33 and 34 until it and the suspended plastic sheets 22 are positioned above the tank or tray 100 of the second rinsing area E. The arrangement of the tanks 87 and 100, as seen in Fig. 9, prevents dripping of the escaping rinse as the carriage is moved from one rinse area to the adjoining area. Preferably, in the second rinsing area for the plastic sheets provision is made for rinsing said sheets with water and subsequently with distilled water or condensate.

According to the desired arrangement of water rinsing, the distilled water is pumped into a pipe supplying system in a manner that either can be independently directed to the head 101.

Figures 10, 11, 12:
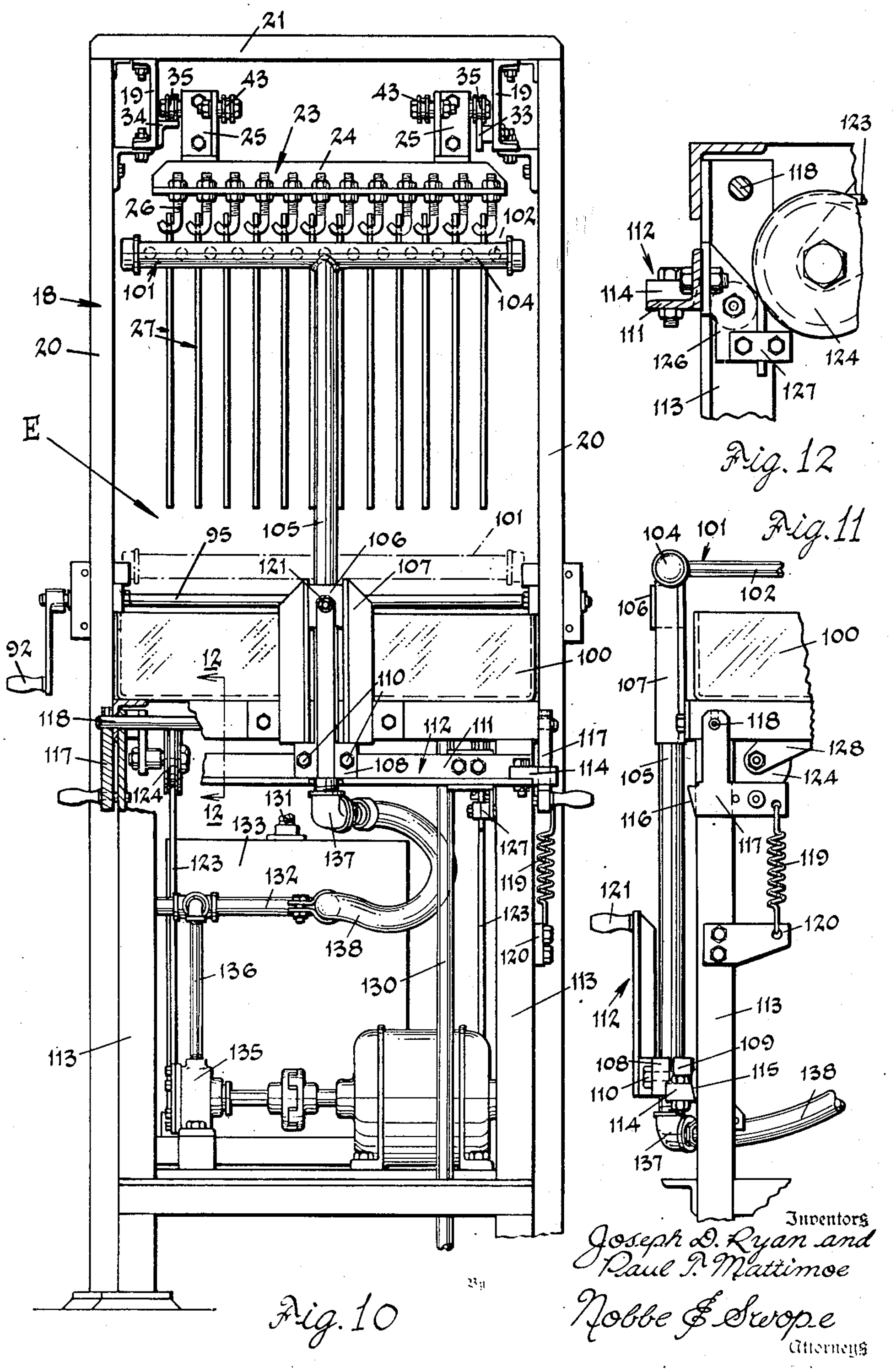
Fig. 10 is an end view of the dyeing apparatus, the rinsing head being shown raised, as at entry of plastic sheets.
Fig. 11 is a fragmentary side view of the end of the apparatus, the rinsing head being positioned at the lower extremity of its movement. Also illustrated therein is the locking device for retaining said head in a position substantially as shown in Fig. 10.
Fig. 12 is a section taken substantially along the line 12—12 in Fig. 10, showing one end connection of a counter-balance for the rinsing head.

This head, as shown in Figs. 9 and 10 and indicated by the numeral 101, comprises a plurality of horizontally disposed pipes 102 having spray orifices 103 drilled therein. Preferably, the orifices are located diametrically opposite in the wall of each of the pipes with the exception of the outermost pipe at each side. Necessarily, the orifices of these pipes are provided in one wall only. The pipes 102 are connected as by welding to a manifold pipe 104 which in turn is welded to a vertically extending pipe 105. The pipe or standard 105 jointly serves as a condiut and as a slide member by which the head 101 generally is raised or lowered with reference to the tank 100, the frame 18 of the apparatus, or the plastic sheets 22.

As illustrated in Figs. 6 and 10, the pipes 102 are arranged to direct the water rinse toward opposed surfaces of the adjoining sheets in areas well above the dye area to create a uniform flooding of the sheets as the water descends on the surfaces. The head 101 is also designed so that the maximum height of the pipes 102 may be adjusted according to the width of the dyed area. In ordinary operation, the height of the pipes, as shown in Fig. 9, has been found to be satisfactory for starting the second rinsing as the carriage is propelled to deliver the plastic sheets between the plurality of spray pipes 102. Once the carriage is stopped, the head 101 is moved downwardly so that the rinsing effect of the water continues until the pipes 102 are carried well beneath the frames 27.

The head 101 moves vertically through a path established by a block or collar 106 through which the pipe 105 passes. The collar is supported within and forms a part of the bracket 107 secured to the apparatus frame structure. Beneath the bracket 107, the pipe 105 is clamped between blocks 108 and 109, each of said blocks having inner surfaces contoured to receive the pipe. To securely clamp said pipe, bolts 110 are extended through the block 108 and threaded into the block 109 which is fixedly secured to the angle 111 comprising in part a traversing carriage 112 for the head 101. The angle 111 extends transversely of the frame structure 18 and substantially along the outer surfaces of the legs 113 thereof.

Blocks 114 are secured at the ends of the angle 111; said blocks having angularly formed surfaces 115 which cooperate with surfaces 116 of latches 117. When the carriage is raised, and near the top of its movement to position the pipes 102 as shown in Fig. 10, the cooperating surfaces 115 and 116 produce deflection of the latches 117 until the lower surfaces of the blocks 114 can be engaged by the latches 117 to retain the head 101 generally in its elevated position. The latches are carried by a cross shaft 118 journalled in the legs 113 and are urged in one direction to engage the blocks 114 by a spring 119 extended between one of said latches and a plate 120 attached to the adjacent leg 113.

If desired, a handle 121 may be affixed to the block 108 in order that the carriage can be manipulated manually in either direction during the rinsing operation. Also, to balance the carriage and assure its descent with an evenness of movement, a weight 122 is connected to the carriage by cables 123 which are trained over pairs of pulleys 124 and 125. One means of attaching the cables to the carriage is shown in detail in Fig. 12 wherein will be seen a bracket 126 secured to angle 111, said bracket having suitable clamping blocks 127 for gripping one end of the cable.

The pairs of pulleys 124 and 125 are arranged beneath the tank 100, as shown in Fig. 9, and pivotally supported on brackets 128 attached to the angles 45 of the framing structure 18. As shown therein, each of the cables is trained over a pulley 124 to the pulley 125 and downwardly to clamps 129 forming a part of the weight 122.

When the head 101 is to be lowered, either of the latches 117 is engaged by its projecting handle to release the blocks 114 and accordingly the carriage 112. During the descending movement of the head 101, the spray of water from the pipes 102 will be directed against the surfaces of the sheets 22 and in running therefrom will be gathered in the tank 100 and discharged to a suitable drain through the pipe 130.

As previously indicated, it has been found advantageous to rinse the plastic sheets with ordinary city main water and subsequently with distilled water or condensate. Such an arrangement is conventionally shown in Fig. 3, wherein the distilled water is supplied from the pipe 131 while pipe 132 supplies ordinary main water, each of said pipes having suitable valves for governing the rate of flow. The supply pipe 131 extends to a reservoir tank 133 which is connected by a pipe 134 to a motor operated pump 135. The pump outlet is connected by a conduit 136 to a fitting located in the pipe 132. The extending end of said pipe 132 is then connected to the vertical pipe 105 of the head 101 by usual fittings 137 and a flexible section of hose 138.

Thus, when first rinsing the sheets 22, the pump 135 is inoperative and city water through pipe 132 is supplied to the head 101 by the hose 138. Following this rinsing, the valve in the pipe 132 is closed and the head raised to its original upper position. The pump 135 is then started and distilled water will be withdrawn from the reservoir 133 by the pipe 134, the pump, and through the conduit 136 to the flexible hose section 138 so that as the head 101 is subsequently lowered, distilled water, or condensate, will be directed against the plastic sheets in a final rinsing operation.

Upon completion of the second rinsing operation, the frames 27 and attached sheets of plastic 22 are removed from the hook bolts 26 and removed to a drying area. When the carriage 23 is emptied of frames, it can be removed to the loading station B of the apparatus and the spray head 101 returned to its elevated position for subsequent use.

In employing the apparatus just described to practice our invention, we first fill the vat 44 with a suitable dye solution. We prefer to employ dyes of a color or shade that are soft and pleasing to the eye, that permit objects to be observed through them with a minimum of distortion to their appearance, and through which primary colors such as the red, green and amber of traffic lights are readily distinguishable.

There are a number of dyes that have such desirable characteristics, but we prefer dyes that also have recognized better than average light stability, and stability to heat at the temperatures required to bond glass and plastic interlayers together.

Examples of such dyes are:

The sodium salt of 1:4 bis ortho-sulpho-para-tolyl aminoanthraquinone (color Index No. 1078), sometimes known in the trade as "Alizarin Cyanone Green G Ex"; the sodium salt of mono-sulpho 1:4 bis para-tolyl aminoanthraquinone, commonly called "Alizarin Cyanone Green GN"; Du Pont Orange II conc. (color Index No. 151); Du Pont Chromacyl Black W; Alizarin Fast Blue RB; Alizarin Violet NRR; Acetamine Black CBS; and Du Pont Nigrosine Base (color Index No. 864).

After selection of the dye, it is necessary to make up the dye solution. As illustrative of our procedure, in using the sodium salt of 1:4 bis ortho-sulpho-para-tolyl aminoanthraquinone, hereinafter referred to as "Alizarin Cyanone Green G Ex" dye, we prepare a dye solution by dissolving about 2% of this dye in a 50% by volume mixture of aqueous denatured alcohol. While solution can be accomplished in many ways, one method is to prepare the solution by heating 400 grams of the dye to reflux temperature in 10 liters of Formula I denatured alcohol (95% ethanol–5% methanol) with stirring, diluting with 10 liters of distilled water and then filtering.

Figure 13:
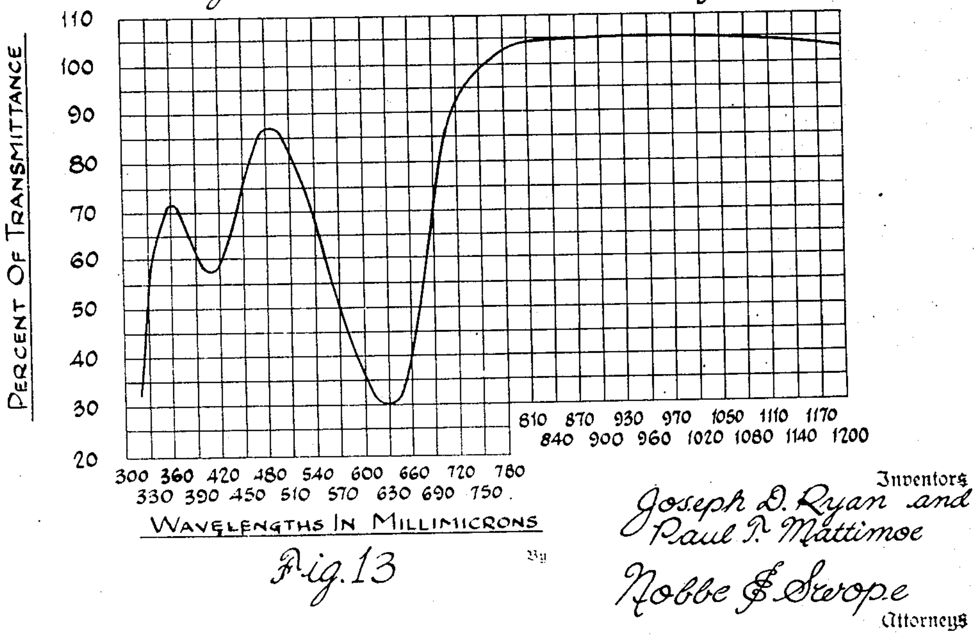
Fig. 13 is a spectral transmittance curve for one of the dyes used in practicing our invention.
Figure 17:
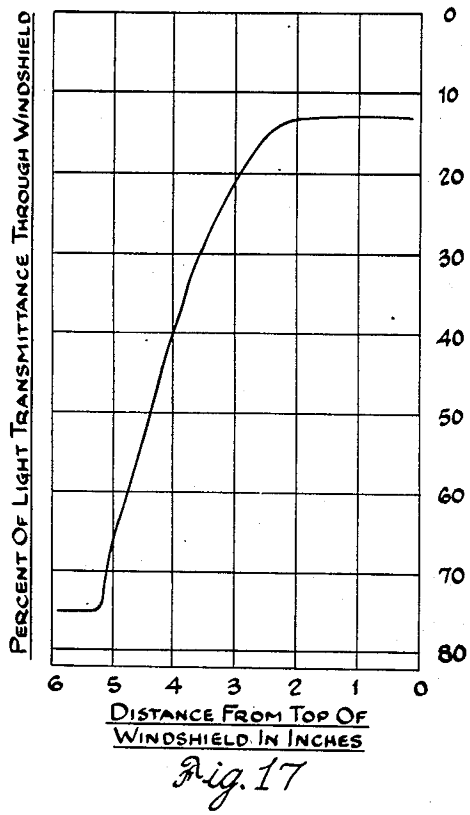
Figure 18:
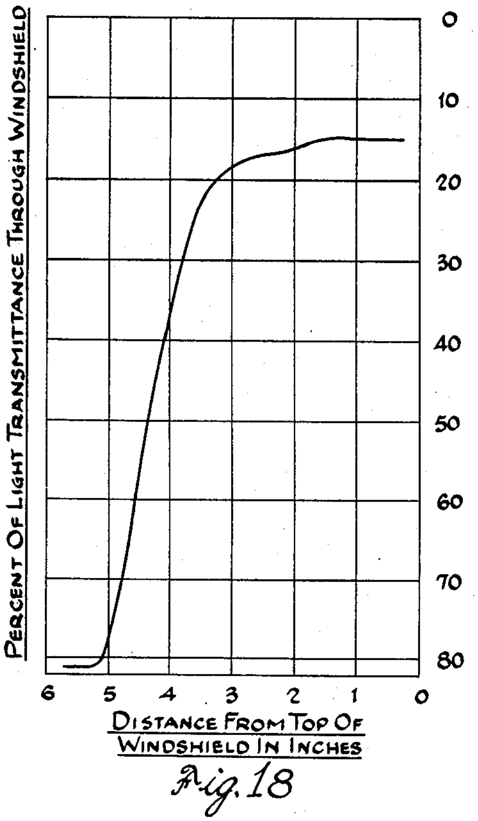

The spectral transmittance of this dye is shown by the curve in Fig. 13.

Other solvents for the dye, such as water, methanol water mixtures, isopropanol water mixtures, etc., may be satisfactorily employed. The main object is to bring the dye into solution using mixtures which will not too rapidly attack the plastic to be dyed during the time and temperature cycle to be used.

When the vat 44 has been filled with the desired dye solution, a group of plastic sheets cut to the required size are fixed to the frame 27. These plastic sheets are preferably cut oversize to permit attachment to the frames and to allow for subsequent orientation when assembling the dyed plastic with the glass sheets. A carriage 23, positioned within the loading section B, is then hung with a capacity load of frames 27 to which the plastic sheets to be dyed have been affixed. The full carriage is then moved from the loading station B onto the elevator 37 in the dipping section C.

The dyeing treatment is applicable to any of the commonly used synthetic resin, laminated safety glass plastics, such as polyvinyl butyral resin sheeting plasticized with 41 parts dibutyl cellosolve adipate, now used by the assignee company, or when plasticized with other suitable plasticizers such as dibutyl sebacate, triethylene glycol dihexoate (commonly called 3-GH) or a mixture of triethylene glycol caprate and triethylene glycol caprylate (known to the art as J-24).

As explained above, by employing a cam of the proper shape, and by proper control of its driven speed, the plastic sheets can be immersed in the dye solution 46 in a manner to produce an even shade over the entire area to be dyed. Or, the margin of the plastic sheets may be shaded gradually and uniformly from a deep hue at the edge to color extinction at the fade-off point. Or, the desired vignetted effect can be obtained by a series of bands with adjacent bands being of graduated intensity from a deep hued band at the plastic edge to a graduated light hued band merging into nothingness at the fade-out or cut-off point.

The advantage of the latter arrangement is that it may be desirable to provide relatively wide areas of substantially uniform hue in certain parts of the colored or shaded area. For example, in a windshield which is bent upwardly over the heads of the front seat occupants, it may be advisable to have a relatively wide band of the darkest hue in that part that is exposed to the direct rays of the sun from overhead.

In order to set the controls to obtain these desired results, it is necessary that a definite schedule for graduated immersion of the plastic in the dye solution be established, and this schedule will depend on the particular shaded effect to be produced.

In immersing the plastic in the dye, it is best to move the elevator 37, carrying the carriage 23, rapidly downward to a predetermined indexing point, at which point the lower edges of the frames 27 are in the dye and the main body of the plastic is about to be immersed. From this point on, any immersion schedule which will give the desired vignetted effect can be used.

For example, by dyeing plastic sheets in accordance with the following immersion schedule, using the Alizarin Cyanone Green G Ex dye solution described above, and then laminating them as interlayers between two sheets of special glass to be hereinafter described, finished windshields having the transmission curve shown in Fig. 15, will be produced:

*Immersion Schedule I*

| Rate of Immersion Inches per Minute | Time No. of Minutes | Distance No. of Inches | Total Distance No. of Inches |
|---|---|---|---|
| 0.111 | 4.5 | 0.5 | 0.5 |
| 0.20 | 2.5 | 0.5 | 1.0 |
| 0.28 | 1.8 | 0.5 | 1.5 |
| 0.36 | 2.8 | 1.0 | 2.5 |
| 0.38 | 1.3 | 0.5 | 3.0 |
| 0.50 | 1.0 | 0.5 | 3.5 |
| 0.82 | 0.61 | 0.5 | 4.0 |
| 1.60 | 0.315 | 0.5 | 4.5 |
| 2.86 | 0.175 | 0.5 | 5.0 |

Temperature of dye 97° F.
This will give a continuous fade-off.

Other dyed plastic sheets having a continuous fade-off, that is proportional to the distance, can be obtained by immersing the sheets according to the following schedule with the dye bath at a temperature of 97° F.:

*Immersion Schedule II*

| Rate of Immersion Inches per Minute | Time No. of Minutes | Distance No. of Inches | Total Distance No. of Inches |
|---|---|---|---|
| 0.042 | 12 | 0.5 | 0.5 |
| 0.135 | 3.7 | 0.5 | 1.0 |
| 0.263 | 1.9 | 0.5 | 1.5 |
| 0.500 | 1.0 | 0.5 | 2.0 |
| 0.81 | 0.62 | 0.5 | 2.5 |
| 1.47 | 0.34 | 0.5 | 3.0 |
| 2.63 | 0.19 | 0.5 | 3.5 |
| 4.55 | 0.11 | 0.5 | 4.0 |
| 7.15 | 0.14 | 1.0 | 5.0 |

Dyed plastic sheets having a 2 in. wide, constant transmission band at one margin, and a continuous fade-off from this band can be obtained by immersing the sheets according to the following schedule with the dye bath at a temperature of 97° F.:

*Immersion Schedule III*

| Rate of Immersion Inches per Minute | Time No. of Minutes | Distance No. of Inches | Total Distance No. of Inches |
|---|---|---|---|
| 1.25 | 0.4 | 0.5 | 2.0 |
| .384 | 1.3 | 0.5 | 2.5 |
| .294 | 1.7 | 0.5 | 3.0 |
| .455 | 1.1 | 0.5 | 3.5 |
| .530 | 0.63 | 0.333 | 3.833 |
| .833 | 0.40 | 0.333 | 4.166 |
| 1.33 | 0.25 | 0.333 | 4.499 |
| 2.27 | 0.22 | 0.500 | 5.00 |

Plastic sheets having a dyed area of 5 inches with approximately a 3 in. constant transmission band at one margin and a continuous fade-off from this band can be obtained by immersing the sheets according to the following schedule in a dye bath at a temperature of 97° F.:

*Immersion Schedule IV*

| Rate of Immersion Inches per Minute | Time No. of Minutes | Distance No. of Inches | Total Distance No. of Inches |
|---|---|---|---|
| 1.67 | 0.2 | 0.333 | 2.833 |
| 0.42 | 0.8 | 0.333 | 3.166 |
| 0.19 | 1.75 | 0.333 | 3.499 |
| 0.27 | 1.25 | 0.333 | 3.832 |
| 0.31 | 0.7 | 0.223 | 4.055 |
| 0.38 | 0.57 | 0.223 | 4.278 |
| 0.62 | 0.35 | 0.223 | 4.501 |
| 1.20 | 0.28 | 0.333 | 4.834 |
| 1.7 | 0.10 | 0.166 | 5.00 |

Upon completion of the dipping cycle, according to the desired immersion schedule, the elevator 37 is raised to withdraw the plastic sheets from the dyeing bath as rapidly as possible and the carriage 23 is then quickly moved, first into the first rinsing section D where the dyed portion of the sheet is immediately rinsed with a mixture of 50% denatured ethanol (95% ethanol–5% methanol) and 50% by volume of distilled water to remove the dyeing solution from the plastic and to arrest the dyeing action, and then into the second rinsing section D where it is rinsed with water.

Two of the steps of our dyeing procedure which are of special importance in producing an accurately controlled intensity in the colored or shaded area of the dyed plastic and in maintaining the area free of streaks and other irregular color variations are: (1) the particular dipping procedure that we use, and (2) the special rinsing technique.

Thus, it will be noted that we do not dip the plastic by first immersing the entire area to be colored and then slowly withdrawing it from the bath, but that, instead, we immerse the area to be shaded slowly and progressively into the dyeing bath until the desired area has been immersed and then quickly withdraw the plastic from the bath. This reduces to a minimum the time during which the free dye solution on the plastic can run down over the dyed area.

This also permits the removal of all parts of the dyed area from the bath just as soon as they have been in contact with the dye solution for the required length of time. And we rinse the dyed area immediately after it has been removed from the bath.

We have found that the composition of the rinse used after the dye bath will depend upon the solvent composition of the dye bath, but that in general mixtures of various water-soluble alcohol-water mixtures are most suitable for producing an imperceptible fade-off from the dyed to the undyed areas.

This is rather surprising because actually the dyes we have used are more soluble in water than in alcohol. Nevertheless, when the dyed area is rinsed first with water, a sharp cut-off line results after drying. On the other hand, when the dyed area is rinsed with alcohol first, the cut-off is much less perceptible and the dyed area blends much more smoothly into the undyed area.

After rinsing, the dyed plastic must be dried. This is most important since considerable quantities of solvents from the dye bath (even up to 25% of the weight of the dipped area of the sheet) may be absorbed during the dyeing process. Actually, all of these solvents and/or water must be removed before the laminating step since not more than .5% can remain if satisfactory adhesion and heat stability (failure to bubble in service) is to be attained.

The plastic therefore is dried on the frame, preferably in an oven at 155° F. to accomplish solvent and/or water removal. Other means, such as by leaching in non-solvents for the plastic which are solvents for the dye bath constituents, may be employed as a preliminary step to oven drying. We have found that it is desirable in some cases to preliminarily dry the plastic for a short time, until tack free, in a clean, dirt and dust free oven, and then finish drying after dusting the surface with a salt such as finely divided sodium bicarbonate. This insures that dirt falling on the plastic during the drying period will be removed in the subsequent plastic washing operation.

After washing, the plastic (moisture and solvent content below 0.5% by weight) is then ready for assembly and laminating together with the glass sheets.

Now we have discovered that the completed unit will have much greater light stability, and better antiglare properties if a protective type of glass is used with the dyed plastics. There are a number of glasses of this general type that will give satisfactory results, the most important properties required being that they transmit a relatively high percentage of visible light while, at the same time, cutting off a relatively high percent of the ultra-violet light.

We have found that glasses intended primarily for heat absorption, glass intended primarily for ultra-violet absorption and certain colored glass, all give very good results both as to light stability and glare protection in our invention, but all are characterized by one identical characteristic, namely, they absorb much more than the usual amount of ultra-violet light.

Contrary to the opinion of the dye-makers, we have discovered that when the dyed plastic is laminated with a sheet or sheets of glass which absorb as much as 34% of ultra-violet light, the dyed area will not fade in normal use. And we have also found that when such glass transmits as much as 70% of visible light it can be satisfactorily used in glazing sight openings such as windshields under the American Standards Association Code.

In the tables below, we have listed six different representative types of glasses which have proved satisfactory for our purpose:

| | Type A | Type B | Type C | Type D | Type E | Type F |
|---|---|---|---|---|---|---|
| $SiO_2$ | 72.41 | 64.54 | 72.06 | 71.91 | 71.08 | 71.31 |
| $Al_2O_3$ | .17 | .19 | .33 | .48 | .24 | .25 |
| $Fe_2O_3$ | .51 | .046 | .50 | .30 | .46 | .329 |
| FeO | | | | | | .23 |
| $TiO_2$ | .013 | 7.16 | .032 | .024 | .020 | .03 |
| CaO | 12.51 | 9.92 | 11.18 | 9.11 | 12.93 | 12.70 |
| MgO | 0.17 | 1.99 | 2.10 | 4.51 | .21 | .05 |
| $Na_2O$ | 13.13 | 11.92 | 13.60 | 13.47 | 14.19 | 14.15 |
| $K_2O$ | | 0.06 | | | | 0.09 |
| $SO_3$ | .14 | .15 | .20 | .20 | .40 | 0.38 |
| $As_2O_5$ | | .45 | | | | tr. |
| $B_2O_3$ | 0.53 | .40 | | | | |
| Cl | .49 | .38 | | | | tr. |
| F | .61 | | | | | |
| $-O_2$ equiv | −.37 | −.08 | | | | |
| $CeO_2$ | | 1.86 | | | | |
| $Co_3O_4$ | | | .00112 | | | |
| $R_2O_3$ | | | | .80 | .72 | |
| RO | | | | 13.62 | 13.14 | |

Types A and F are heat absorbing glasses, type B is a golden colored glass, type C is a blue-green colored glass, and types D and E are other special protective glasses. These glasses have the following average transmittances:

[Transmittances—percent]

| Glass | Thick. | U. V. | Ill. A | Ill. C | I. R. | Total Rad. |
|---|---|---|---|---|---|---|
| Type A | .112 | 63.5 | 82.0 | 83.3 | 37.9 | 57.4 |
| Type B | .109 | 2.6 | 86.8 | 85.6 | 90.6 | 82.5 |
| Type C | .111 | 60.7 | 82.7 | 83.7 | 55.2 | 67.0 |
| Type D | .119 | 65.7 | 85.9 | 86.5 | 67.1 | 74.8 |
| Type E | .120 | 57.3 | 84.7 | 85.4 | 54.7 | 67.3 |
| Type F | .111 | 42.1 | 75.7 | 77.1 | 29.3 | 49.1 |

Preparatory to laminating, the dyed plastic 17, after being cut from the frame, is assembled with two sheets of any one of the protective glasses listed above, or with any glass having similar ultra-violet absorbing and visible light transmitting properties, as shown in Fig. 14. Alternately, it may be assembled with only one sheet of protective glass, as the outside sheet, and one sheet of ordinary non-protective type glass as the inside sheet.

The glass sheets are preferably cut to size, and bent when necessary, prior to assembly with the plastic, but the plastic is preferably provided in oversize block pattern and cut to size afterwards. When this is done, the edges of the plastic interlayer will extend past the edges of the glass as shown at 139 in Fig. 14, and this permits the dyed area of the plastic to be accurately positioned relative to the glass.

We wish to emphasize that it is important that the dyed portions be so positioned in different units that the cut-off line of the shaded or colored portions is in alignment in the right and left hand halves of the two-piece windshield 10, when a two-piece windshield is used. Moreover, it may be desired to position the plastic so that the cut-off line is parallel with the horizon in some cases, or parallel with the top of the windshield in others. Also, the desired positioning of the colored portions of the windshield may differ with different makes, styles or models of cars.

After the glass sheets 15 and 16 and plastic interlayer 17 have been assembled in the manner outlined above to form a glass-plastic sandwich, the assembled unit is laminated by any of the standard laminating procedures to securely bond the several laminations into a unitary structure.

When units, using plastic interlayers dyed with "Alizarin Cyanone Green G Ex" dye solution, as described in detail in Immersion Schedules I, II, III, and IV above, and two sheets of type "C" protective glass, are made up into windshields, the windshields will be provided with an integral, built-in antiglare screen which extends from the top edge thereof downwardly for a distance of about 5 inches, and will have a visible light transmission respectively as shown in Figs. 15, 16, 17 and 18.

In other words, the colored portion of the windshields will be graduated from a relatively deep, dense green shade at the top to a very light green shade toward the middle, and will have a barely discernible cut-off line at the bottom of the colored area.

To our surprise, we found that the manner in which the color varies from dark to light, the extent of the colored area, the overall depth of color and the color at any one of several points can be varied by controlling the temperature of the dye solution, the solvent or solvent mixtures used, the concentration of dye, and the time and speed of the immersion schedule.

In fact, so far as we can find there is no literature dealing with the dyeing of plastics and for this reason we have set forth here complete information gained from our own work that will enable others to adequately practice our invention.

Thus, in our studies of dyeing plastics, we have found that a number of important factors must be governed, namely, time of contact with the dye solution, concentration of the dye in the solution, ratio of solvents used for the dye solution, make-up or type of solvent used as well as the temperature of the dye bath.

Figure 19:
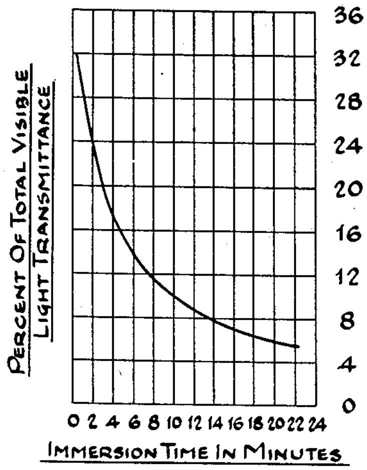
Fig. 19 is a curve showing the effect of immersion time on the depth of coloration in the dyed plastic.

Considering these factors separately, in general as the time of immersion of the plastic in the dye bath is increased the deeper the coloration, although depth of color or lowering of light transmission is not directly proportional to time keeping other factors constant. This point is illustrated by the curve shown in Fig. 19.

Figure 20:
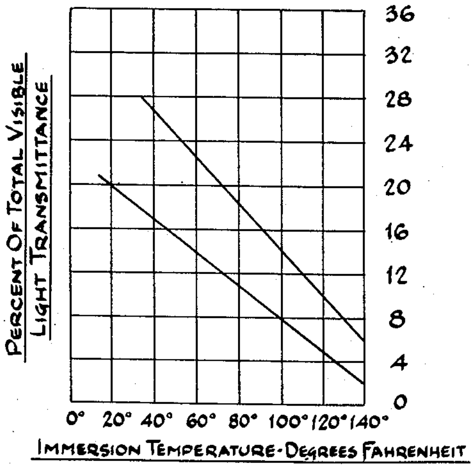
Fig. 20 is a curve showing the effect of immersion temperatures on the depth of coloration in the dyed plastic.

Now if time of plastic immersion in the dye bath is kept constant, we have found that depth of color or lowering of light transmission is greatly influenced by temperature keeping dye concentration and the solvent constant. To illustrate, see the curves of Fig. 20.

Figure 21:
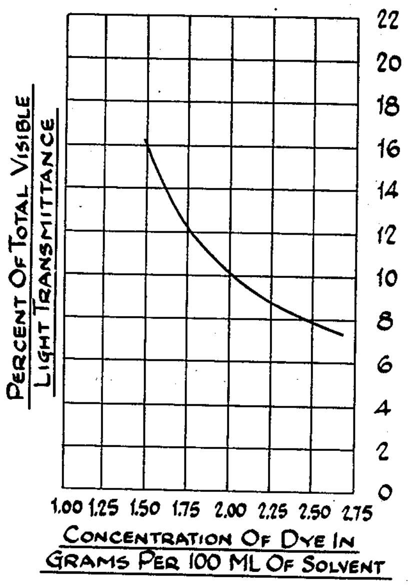
Fig. 21 is a curve showing the effect of dye concentration on the depth of coloration in the dyed plastic.

If again temperature is maintained constant, the solvent mixture for the dye maintained uniform in composition as well as the time, the depth of color of the plastic or lowering of light transmission is influenced greatly by dye concentration within the limits of solubility of the dye in the dye bath. See curve of Fig. 21 attached.

Figure 22:
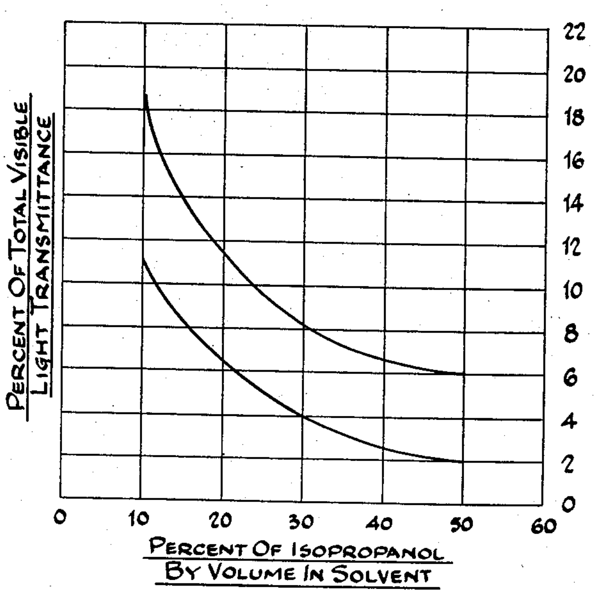
Fig. 22 is a graphic illustration of two curves, showing the effect of the solvent composition used in dissolving the dye on the depth of coloration in the dyed plastic.

We have further found that maintaining temperature of the dye bath constant, the concentration of dye constant, and the time of immersion constant, that the depth of coloration of the plastic or lowering of light transmission is affected by the solvent composition used in dissolving the dye. To illustrate, we have here employed mixtures of water-denatured alcohol or isopropanol which, as seen from the curve in Fig. 22, influences color depth.

As pointed out heretofore, prior to our discovery, we were told by several leading plastic manufacturers that it was practically impossible to produce the colored plastic of our invention at a commercially feasible price, and it was emphasized by the dye makers that even if produced such plastics would not be sufficiently light stable for automotive use.

However, contrary to these opinions of experts in the plastic art, we have exposed units made in accordance with this invention to radiations from a quartz mercury arc lamp, according to the standard American Standards Association Code test for light stability for laminated safety glass, for over 500 hours, which is the equivalent of from 4 to 5 years actual service in an automobile, with no noticeable fading of the colored plastic; and further we have found that the cost of producing one of our units is only slightly greater than the cost of producing a similar laminated safety glass unit without the built-in anti-glare screen.

Although our glare-reducing unit is especially valuable for use in glazing automobiles, aircraft and similar vehicles, it will be appreciated that it has many other potential uses as well; and in lieu of laminating the shaded or colored plastic with two sheets of protective glass, we may also laminate it with a single layer of such glass. Or, it may be incorporated into a unit including more than two sheets of glass and more than one plastic interlayer and/or, in some cases, with an air space between adjacent glass sheets.

In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a method of producing a laminated safety glass antiglare screen having a dyed area of gradually decreasing hue from an edge toward the middle thereof, the steps of dyeing an area of a sheet of polyvinyl acetal resin plastic prior to laminating it with a glass sheet which comprises, suspending the sheet to be dyed above a bath of a solution of dye in a liquid swelling agent for the plastic and solvent for the dye and a diluent, causing relative movement between said sheet and said dye bath to gradually immerse the former in the latter for a predetermined distance and at predetermined rates of speed, then quickly withdrawing the plastic from the dye bath, immediately rinsing the dyed area with a rinse comprising a liquid swelling agent for the plastic and solvent for the dye and a diluent and having a concentration of swelling agent that is no less than the concentration of swelling agent in said dye bath to blend the dyed and undyed areas, then rinsing the dyed area with water, and finally drying said dyed and rinsed plastic sheet.

2. In a method of producing a laminated safety glass antiglare screen having a dyed area of gradually decreasing hue from an edge toward the middle thereof, the steps of dyeing an area of a sheet of polyvinyl butyral resin plastic prior to laminating it with a glass sheet which comprises, suspending the sheet to be dyed above a bath of a solution of an acid dye in alcohol and water, lowering said sheet toward said bath to gradually immerse the former in the latter for a predetermined distance and at predetermined rates of speed, then quickly withdrawing the plastic from the bath, immediately rinsing the dyed area first with an alcohol and water mixture that has no less solvent action on the plastic than the dye bath to blend the dyed and undyed areas, then with water, and finally drying said dyed and rinsed plastic.

3. In a method of producing a laminated safety glass antiglare screen having a dyed area of gradually decreasing hue from an edge toward the middle thereof, the steps of dyeing an area of a sheet of polyvinyl acetal resin plastic prior to laminating it with a glass sheet which comprises, suspending the sheet to be dyed above a bath of a solution of dye in aqueous alcohol, causing relative movement between said sheet and said bath to gradually immerse the former in the latter for a predetermined distance and at predetermined rates of speed, then quickly withdrawing the plastic from the bath, and immediately rinsing the dyed area with a water soluble alcohol and water mixture that has no less solvent action on the plastic than the dye bath to blend the dyed and undyed areas, and finally drying said dyed and rinsed plastic.

4. In a method of producing a laminated safety glass antiglare screen having a dyed area of gradually decreasing hue from an edge toward the middle thereof, the steps of dyeing an area of a sheet of polyvinyl butyral resin plastic prior to laminating it with a glass sheet which comprises, suspending the sheet to be dyed above a bath of a solution of the sodium salt of 1:4 bis ortho-sulpho-tolyl aminoanthraquinone (color index No. 1078) in aqueous denatured alcohol, causing relative movement between said sheet and said bath to gradually immerse the former in the latter for a predetermined distance and at predetermined rates of speed, then quickly withdrawing the plastic from the bath, and immediately rinsing the dyed area first with an alcohol water mixture that has no less solvent action on the plastic than the dye bath, and then with water.

JOSEPH D. RYAN.
PAUL T. MATTIMOE.

REFERENCES CITED

The following references are of record in the file of this patent:

UNITED STATES PATENTS

| Number | Name | Date |
|---|---|---|
| 500,915 | Leonhard | July 4, 1893 |
| 682,412 | Hunt | Sept. 10, 1901 |
| 738,270 | Worcester | Sept. 8, 1903 |
| 2,260,543 | Smith | Oct. 28, 1941 |
| 2,400,720 | Staudinger | May 21, 1946 |
| 2,537,177 | Woodruff | Jan. 9, 1951 |

FOREIGN PATENTS

| Number | Country | Date |
|---|---|---|
| 576,793 | Great Britain | Apr. 18, 1946 |
| 599,985 | Germany | July 19, 1934 |